S. A. MICKELS AND A. NEWMAN.
FRUIT PICKER.
APPLICATION FILED JUNE 15, 1918.
1,418,599.
Patented June 6, 1922.
3 SHEETS—SHEET 3.
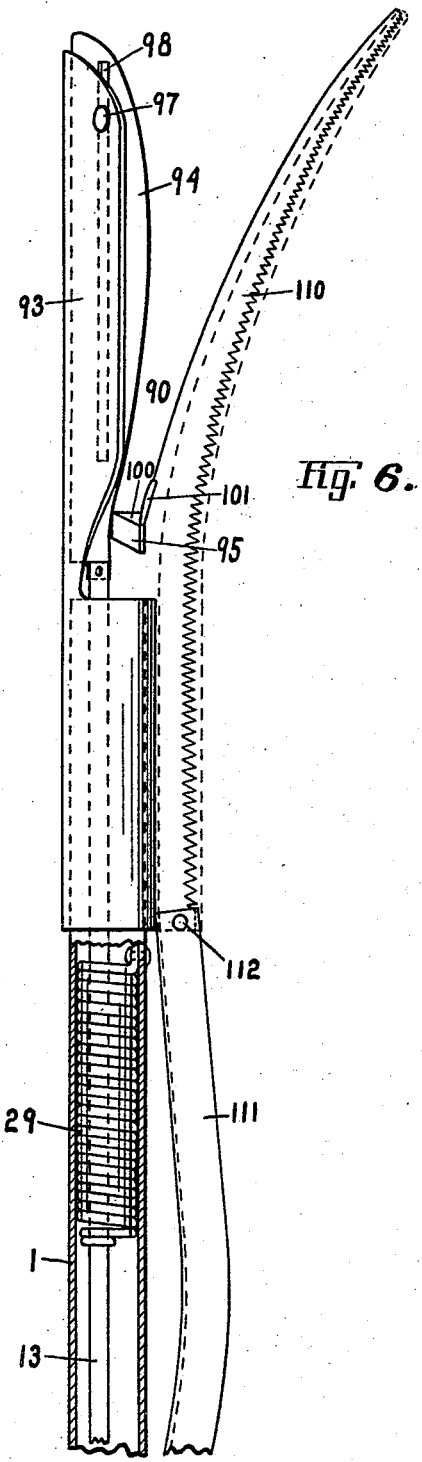
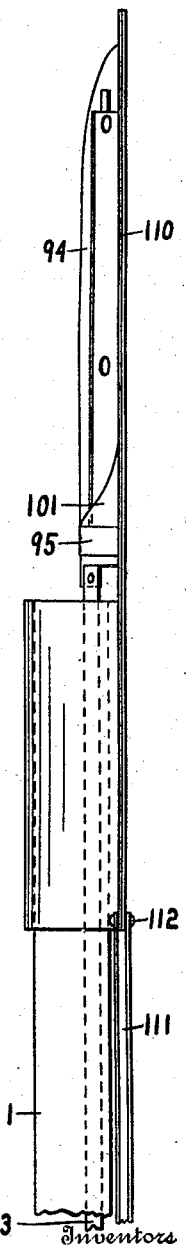

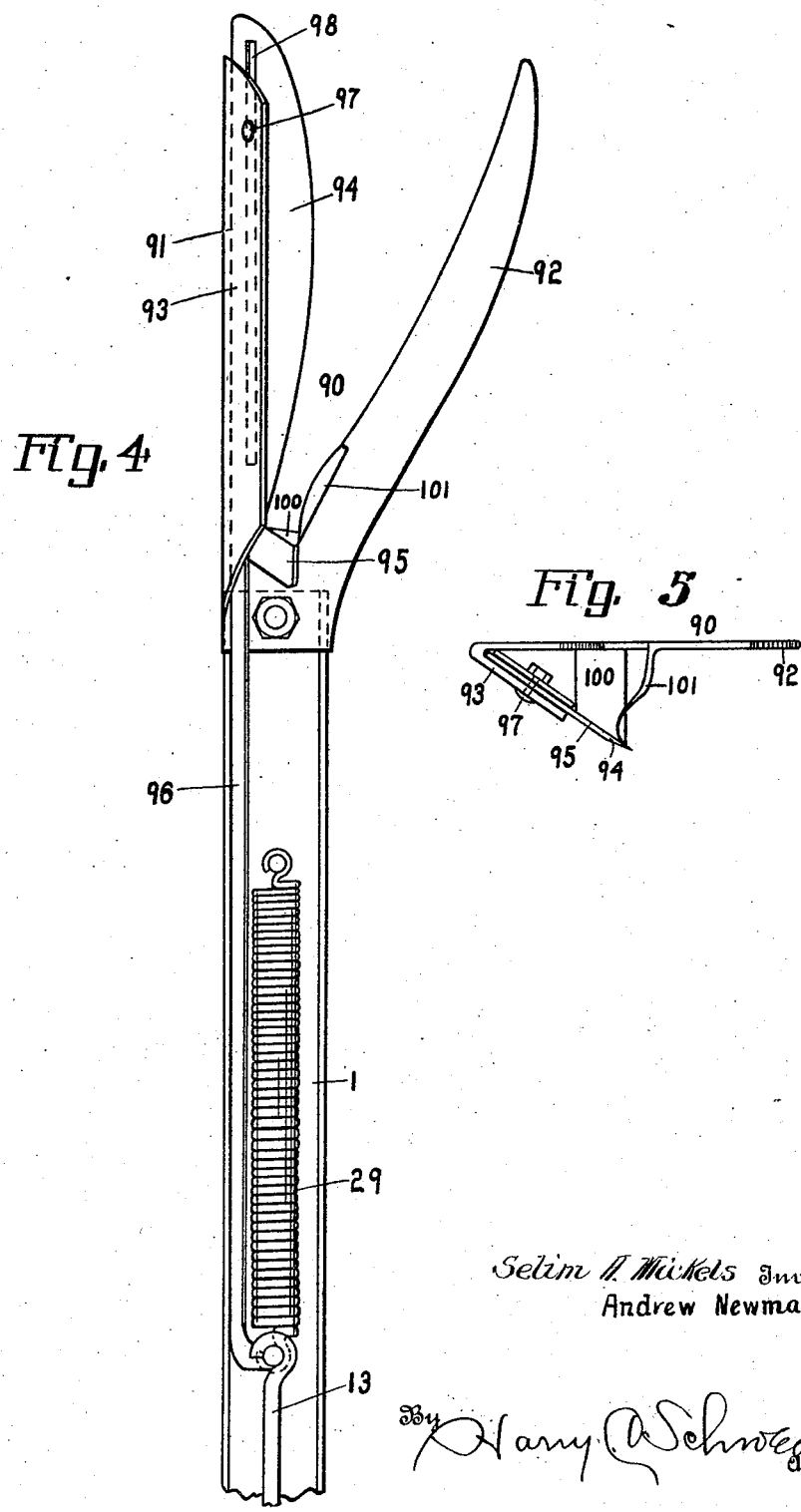

UNITED STATES PATENT OFFICE.

SELIM A. MICKELS AND ANDREW NEWMAN, OF OAKLAND, CALIFORNIA.

FRUIT PICKER.

1,418,599.  Specification of Letters Patent.  Patented June 6, 1922.

Application filed June 15, 1918. Serial No. 240,195.

*To all whom it may concern:*

Be it known that we, SELIM A. MICKELS and ANDREW NEWMAN, citizens of the United States, residing at Oakland, in the county of Alameda and State of California, have invented certain new and useful Improvements in Fruit Pickers, of which the following is a specification.

This invention is an improved horticultural implement particularly useful for picking fruit and for pruning fruit trees.

A further object is to provide a cutting mechanism that may be operated by either hand of the operator and be extended to the topmost branches of a tree with sufficient cutting power to sever the stems of fruit ready for harvest.

A further object is to enclose all the working parts of the implement so that it will be protected from twigs, leaves and debris of orchards.

A further object is to provide an improved implement for pruning trees.

In this specification and the annexed drawings, we disclose our invention in the form which we consider the best, but we do not limit our invention to such form because it may be embodied in other forms and it is to be understood that in and by the claims following the description herein we intend to cover our invention in whatever form it may be embodied.

Referring to the drawings:

Figure 1 is a longitudinal sectional view of the operating mechanism.

Figure 2 is an end view of said operating mechanism.

Figure 3 is a cross sectional view of said operating mechanism taken on line 14—14 of Fig. 1.

Figure 4 is an elevation of one form of cutter.

Figure 5 is a plan view of the cutter shown in Fig. 4.

Figure 6 is a side elevation of a modified form.

Figure 7 is a side elevation of said modified form taken at right angles to Figure 6.

Referring to the drawings, 1 indicates a tubular handle carrying our fruit picking device.

The lower end of the handle 1 is threaded and a casing 80 has a neck 81 which screws onto said threaded lower end of the handle. The chain 7 is connected to a rod 13 extending through the handle 1 and to the swinging end of a rock arm 82 pivotally mounted within the casing 80 on pivot 83 secured in the side walls of the casing. A roller 84 is journaled in the casing over which roller the chain 7 passes and which causes the chain 7 to pull the rod 13 straight. A link 85 is connected at one end to the arm 82 and at its other end to the inner end of an operating lever 86 pivotally mounted on a pivot 87 secured in the casing and extending through a slot 88 in the casing. A fixed arm 89 extends from the casing 80 in alignment with the outer portion of the operating lever 86. Said levers 86 and 89 are curved so that they may be readily grasped to swing the lever 80 to operate the implement.

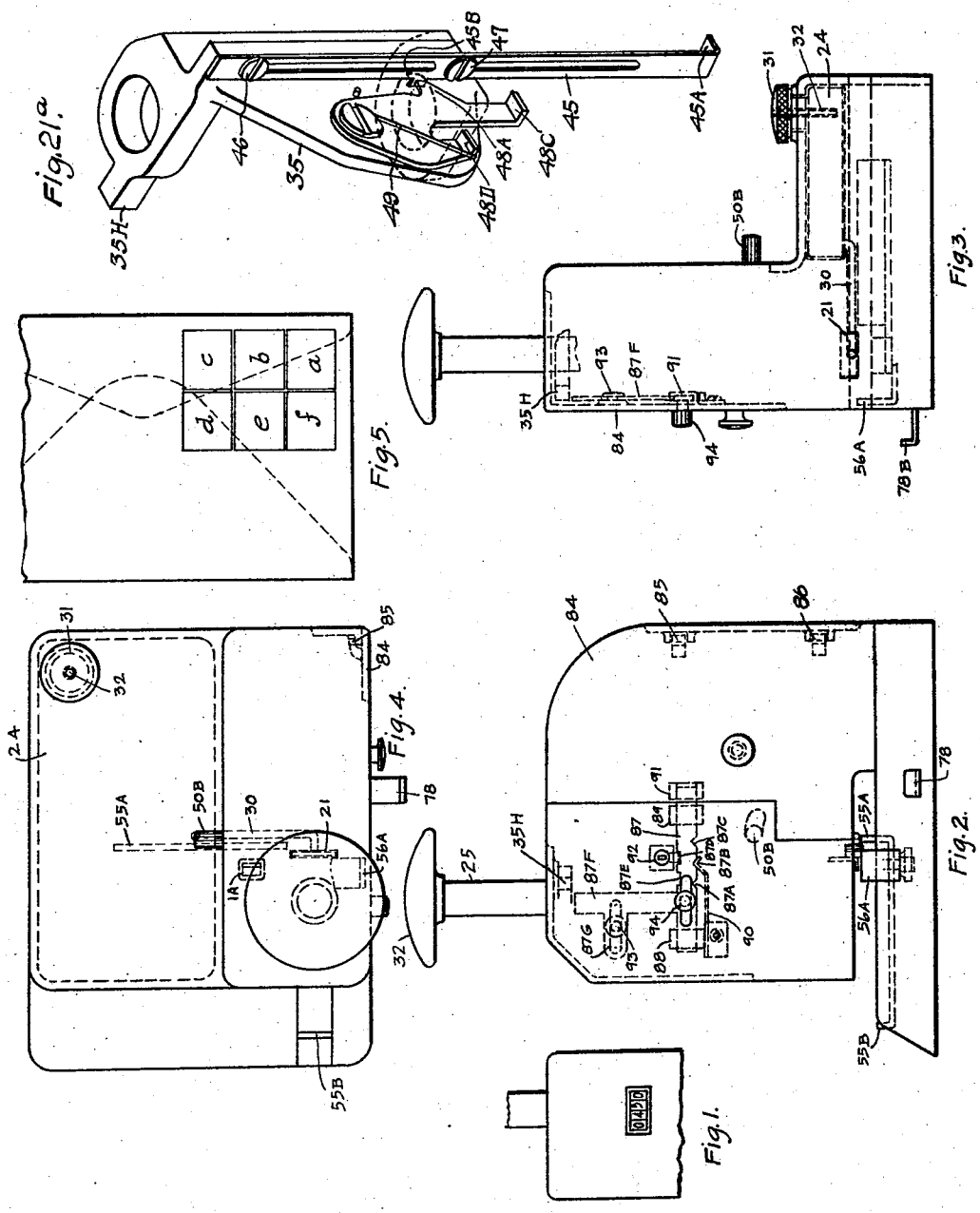

A fork 90 including prongs 91 and 92 is bolted to the upper end of handle 1 in such position that the crotch of the fork rests at top of the handle, the prong 91 extends straight up from the top of the handle in parallel alignment therewith, and the prong 92 diverges from the crotch of the fork away from the prong 91. An outer guide 93 extends at an angle from the outer edge of the prong 91, on the inner side of which member a blade 94 is arranged to reciprocate vertically. An inner guide end shear member 95 extends from the prong 91 at the crotch of the fork at an angle corresponding to that of the guide 93 and at a distance from said guide sufficient to allow the blade 94 and its depending arm 96 to reciprocate between the guides, said guides guiding the blade at an angle so that the blade may positively cut a branch, resting in the crotch of the fork, at an angle. Screws 97 extend through guide 93 and through a longitudinal slot 98 in blade 94 and engage a guide plate 99, whereby said plate is held against said blade and the blade is held against said guide, thus maintaining the blade in straight reciprocating relation. A bottom rest 100 extends rearwardly from the crotch of the fork and to the shear edge of said guide and shear member. A side rest and shear member 101 extends rearwardly from the inner edge of the fork prong 92 and upwardly from the apex of the bottom rest 101. The arm 96 is connected to the upper end of rod 13. The spring 29 is employed in this form of my invention. The branch is introduced into the crotch of the fork 90 upon rest 100 and against rest 101. The implement is operated to draw down rod 13 which draws blade 94 and said blade